(12) United States Patent
Kulick, III et al.

(10) Patent No.: US 11,333,180 B2
(45) Date of Patent: *May 17, 2022

(54) MECHANICAL ASSEMBLY FOR SECURING SHEETS AND RELATED METHOD

(71) Applicant: Brentwood Industries, Inc., Reading, PA (US)

(72) Inventors: Frank M. Kulick, III, Reading, PA (US); Brian Edwards, Reading, PA (US); Luke Lingle, Reading, PA (US)

(73) Assignee: BRENTWOOD INDUSTRIES, INC., Reading, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/610,241

(22) PCT Filed: Apr. 27, 2018

(86) PCT No.: PCT/US2018/029861
§ 371 (c)(1),
(2) Date: Nov. 1, 2019

(87) PCT Pub. No.: WO2019/209324
PCT Pub. Date: Oct. 31, 2019

(65) Prior Publication Data
US 2021/0040968 A1    Feb. 11, 2021

(51) Int. Cl.
*B32B 3/30* (2006.01)
*F16B 5/00* (2006.01)
(Continued)

(52) U.S. Cl.
CPC .......... *F16B 5/0096* (2013.01); *B21D 39/031* (2013.01); *B32B 3/06* (2013.01); *B32B 3/28* (2013.01); *B32B 3/30* (2013.01)

(58) Field of Classification Search
CPC ..... B32B 3/06; B32B 3/28; B32B 3/30; F16B 5/0096; B21D 39/031
See application file for complete search history.

(56) References Cited

U.S. PATENT DOCUMENTS 3,086,899 A * 4/1963 Smith et al. .......... E04C 2/3405
428/158
3,899,805 A   8/1975 McMillan
(Continued)

FOREIGN PATENT DOCUMENTS

DE    4005176 A1    8/1991
JP    2013544667 A    12/2013
(Continued)

OTHER PUBLICATIONS

Extended European Search Report dated Oct. 29, 2021 in European Application No. 18915847.0.
(Continued)

*Primary Examiner* — Donald J Loney
(74) *Attorney, Agent, or Firm* — Panitch Schwarze Belisario & Nadel LLP

(57) ABSTRACT

A mechanical assembly for securing a first sheet to a second sheet includes a first projection having a first sidewall and a first top wall. The first sidewall extends from the first top wall at a first acute angle. The first sidewall includes a first top end and a first bottom end. A first discontinuity is defined in the first sidewall between the first top end and the first bottom end. A first base wall extends from the first bottom end. The first base wall extends generally parallel to the first top wall.

7 Claims, 14 Drawing Sheets

(51) Int. Cl.
*B21D 39/03* (2006.01)
*B32B 3/28* (2006.01)
*B32B 3/06* (2006.01)

(56) References Cited

U.S. PATENT DOCUMENTS

| | | | |
|---|---|---|---|
| 4,395,448 | A | 7/1983 | Lefevre et al. |
| 4,496,052 | A | 1/1985 | Nertman |
| 4,668,443 | A | 5/1987 | Rye |
| 4,760,634 | A | 8/1988 | Rapp |
| 5,374,468 | A | 12/1994 | Babinsky et al. |
| 5,976,672 | A | 11/1999 | Hodgetts |
| 6,544,628 | B1 | 4/2003 | Aull et al. |
| 6,640,427 | B2 | 11/2003 | Aull et al. |
| 6,877,205 | B2 | 4/2005 | Aull et al. |
| 6,926,947 | B1 | 8/2005 | Seckel |
| 6,939,599 | B2 * | 9/2005 | Clark ................. B32B 3/30 428/178 |
| 8,844,136 | B2 | 9/2014 | Woicke |
| 2010/0015385 | A1 | 1/2010 | Woicke |
| 2015/0336080 | A1 | 11/2015 | Krell et al. |

FOREIGN PATENT DOCUMENTS

| | | |
|---|---|---|
| WO | 9533138 A1 | 12/1995 |
| WO | 9744128 A1 | 11/1997 |

OTHER PUBLICATIONS

Office Action dated Dec. 21, 2021 in JP Application No. 2021509719.

* cited by examiner

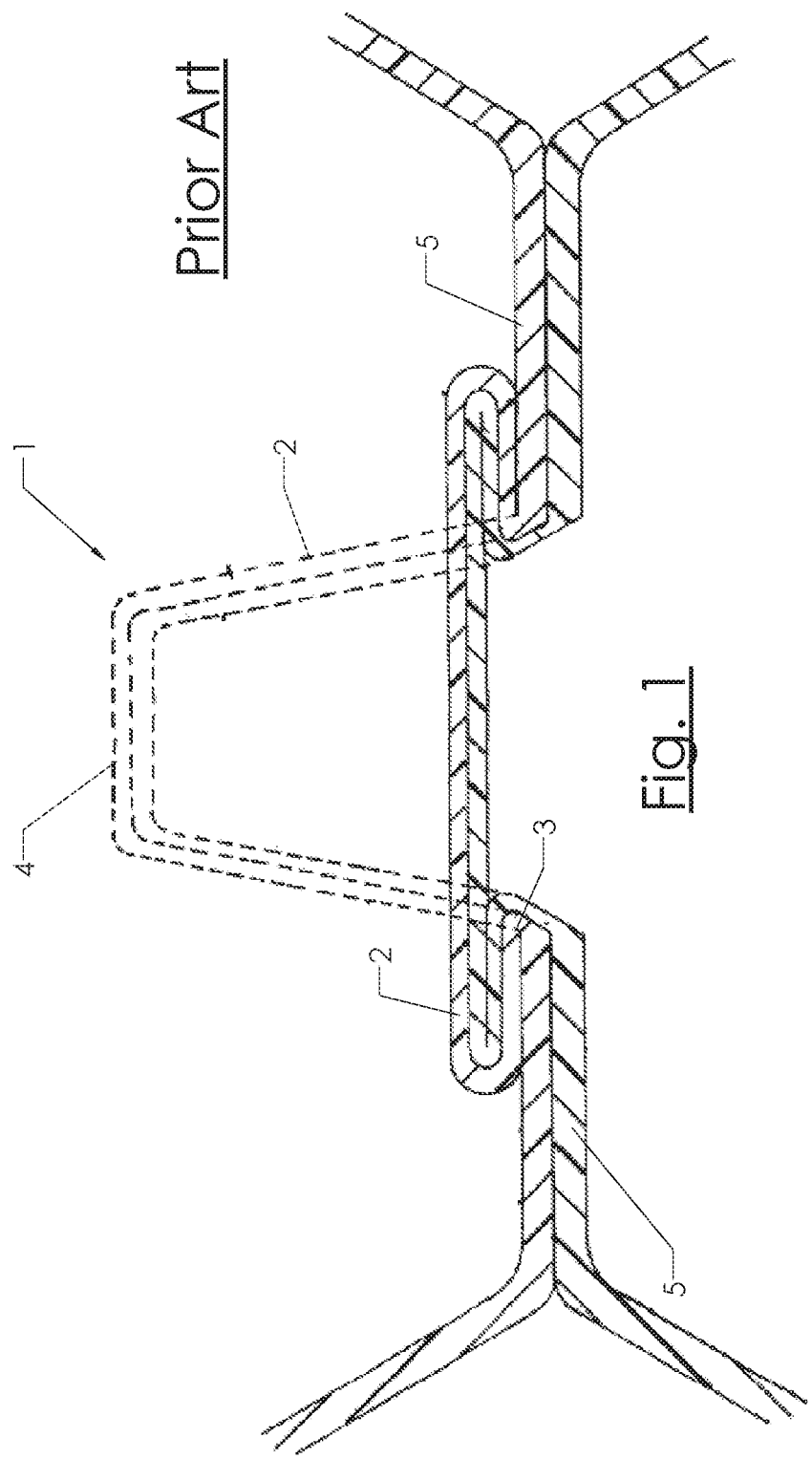

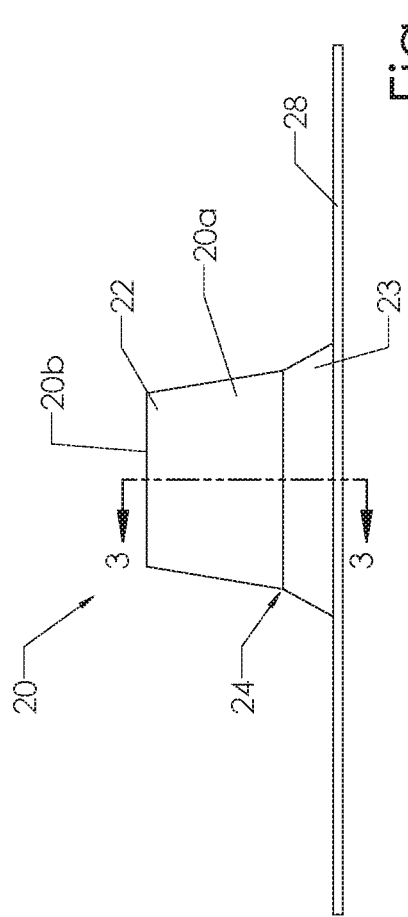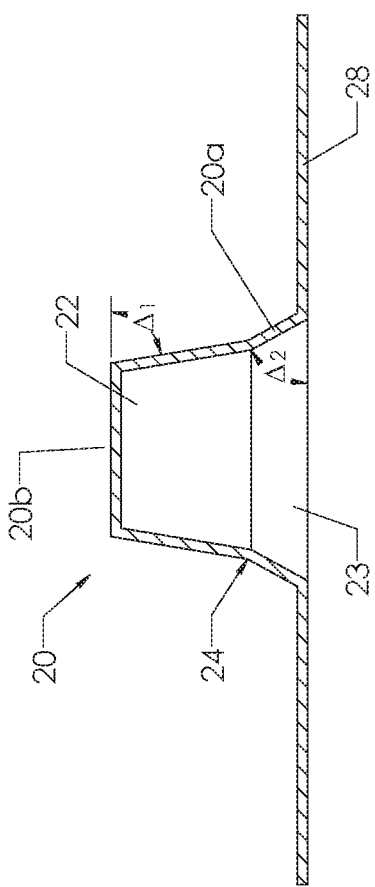

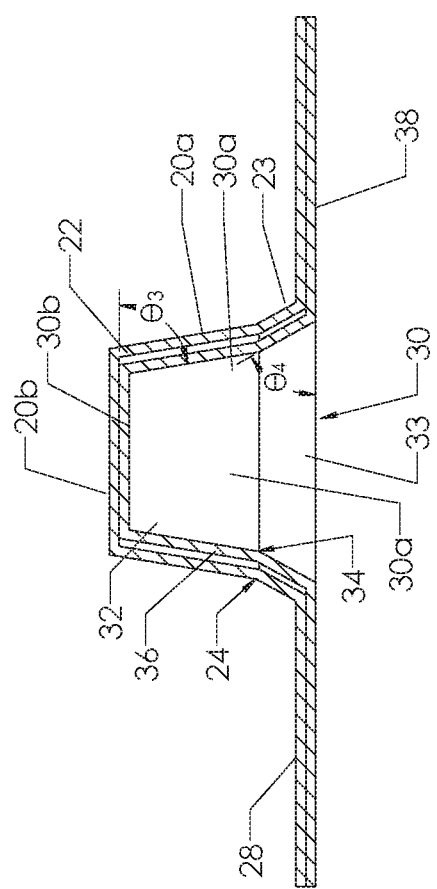

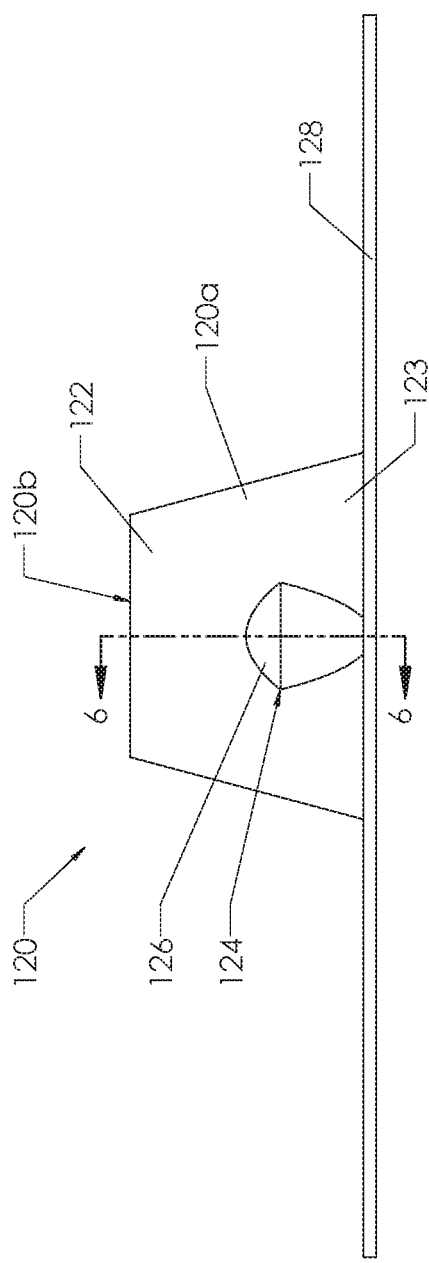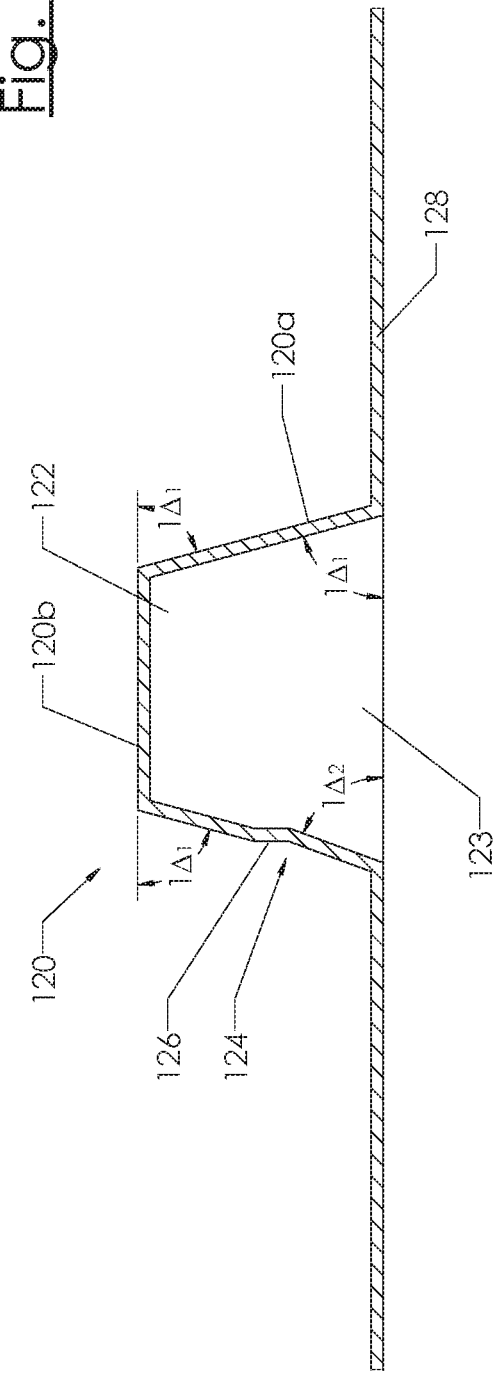

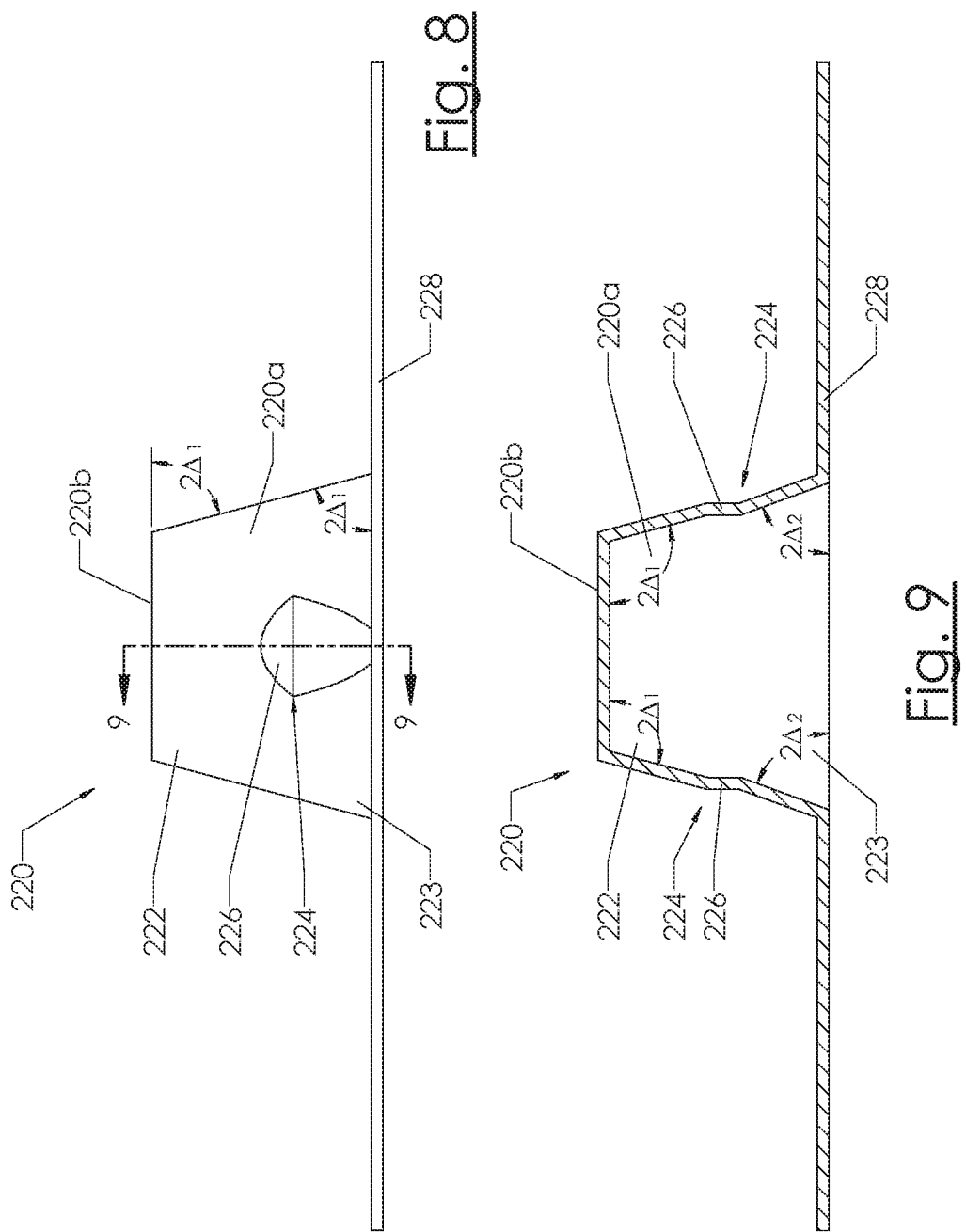

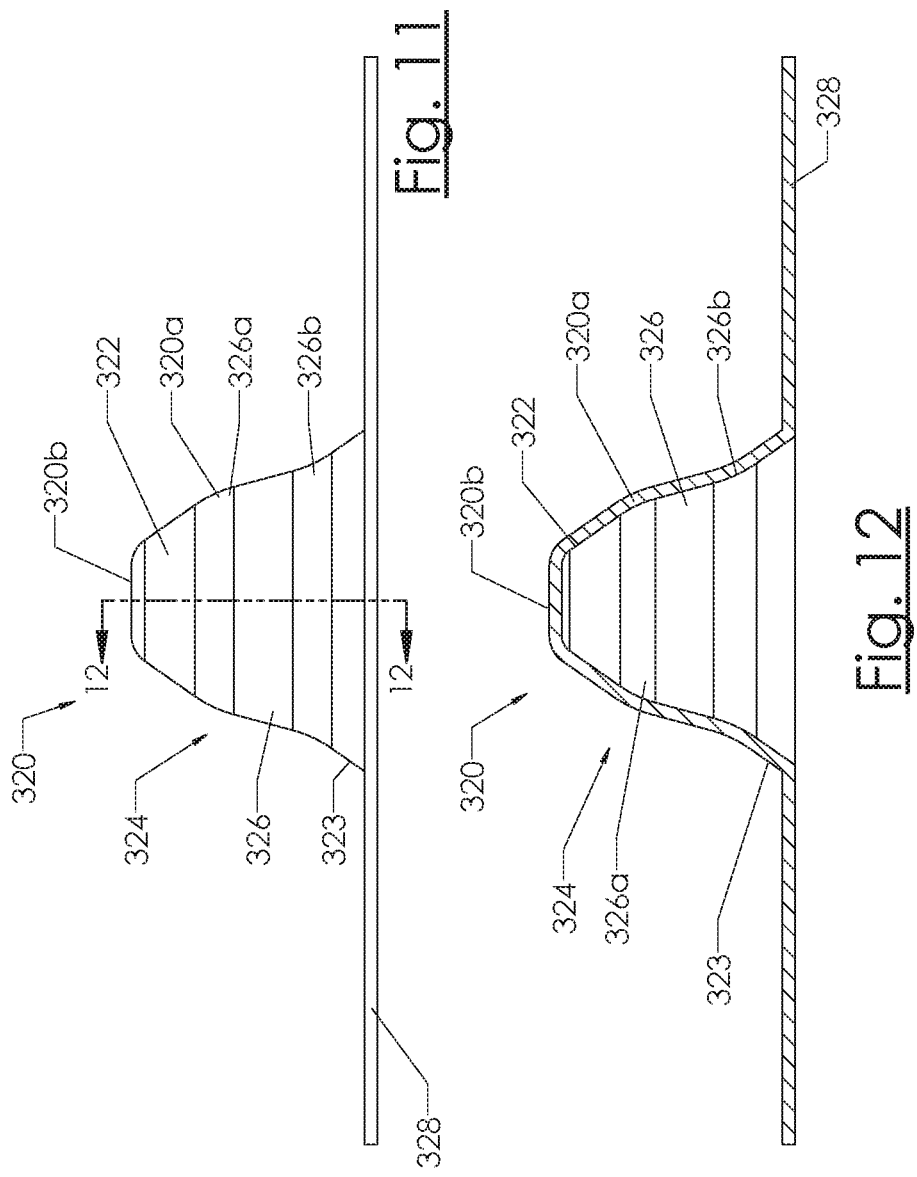
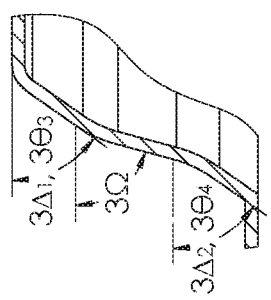

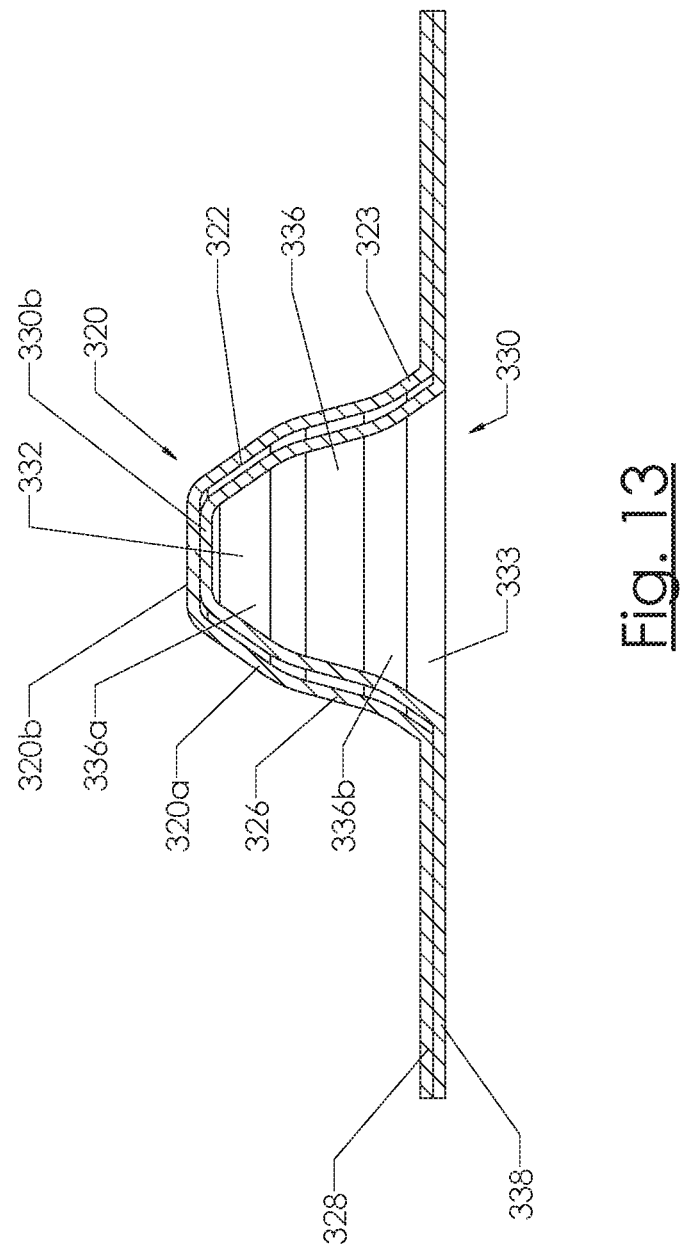

MECHANICAL ASSEMBLY FOR SECURING SHEETS AND RELATED METHOD

CROSS-REFERENCE TO RELATED APPLICATION

This application is a Section 371 national phase application of International Patent Application No. PCT/US2018/029861, filed Apr. 27, 2018, the entirety of which is incorporated herein by reference.

BACKGROUND OF THE INVENTION

Mechanical assembly (MA) or positive locking refers generally to methods and structures for connecting structures with mechanical mechanisms. The MA described herein relates to mechanically connecting two polymeric sheets or films into pairs and pairs into packs or contact bodies, such as utilizing the mechanisms and methods for mechanically deforming materials into contact bodies or contact sheets described in U.S. Pat. No. 6,640,427 ("427 patent"), filed Oct. 24, 2002 and titled, "Apparatus for Making Contact Bodies;" U.S. Pat. No. 6,544,628 ("628 patent"), filed Sep. 13, 2000 and titled, "Contact Bodies and Method and Apparatus of Making Same" and U.S. Pat. No. 6,877,205 ("205 patent"), filed Oct. 24, 2002 and titled, "Method of Making Contact Bodies," the contents of which are incorporated herein by reference in their entirety.

Referring to FIG. 1, the shape of the prior art MA feature or truncated cones 1 of the '427 patent is a symmetric truncated cone with linear sidewalls 2 in an undeformed or nested configuration, as is shown in FIG. 1 in dashed linetype. The sidewalls 2 of the truncated cones or projections 1 are straight and continuous between a base 3 and a top 4 of the cone or projection 1 and are straight around an entire circumference of the truncated cones 1, before being crushed to form a rivet-like mechanical assembly. The truncated cone 1 specifically has linear vertical sides 2 that project upward from the peaks and valleys of a thermoformed sheets or films 5. Combining the two sheets by deforming, crushing or buckling the truncated cones or projections 1 together to make a pair of connected sheets 5 and connecting sufficient pairs to make a pack of sheets defines a contact body. The MA truncated cones 1 are generally aligned between sheets through the intersecting or crossing points of the stacked sheet peaks and valleys by nesting the projections or truncated cones 1. The sheets may also include specific features that are aligned between sheets to enable assembly, e.g. offsets or protrusions specific non-contact sheet assemblies are utilized. The MA truncated cone or projection 1 on one sheet is nested with another MA truncated cone 1 of the adjacent sheet and crushed to form an MA attachment, positive lock or projection-depression coupling between the adjacent sheets.

Even though the side walls 2 of the MA truncated cone 1 are linear and pitched inwardly from vertical, the walls 2 form a feature having column-like strength, that is, the nested MA truncated cones 1 require a significant force to cause the walls 2 of the cones 1 to buckle to form the MA attachment or positive lock. The side walls 2 have a generally consistent cross-sectional thickness between the top and wall and the base, except for a smaller cross-sectional thickness formed near the top of the cones 1. The smaller cross-sectional thickness near the top of the cones 1 generally begins to crush as the material is loaded and goes into compression. As the load increases, the material near the top of the cone strain or orientation hardens to stabilize the top of the cone prior to the sidewalls buckling. The failure location can vary due to slight variations in manufacturing quality from calendaring raw sheet material and the thermoforming process, resulting in inconsistent failure locations along the height of the cone 1 during formation of the MA. Although FIG. 1 shows an idealized configuration of the MA in a crushed configuration, the inconsistent failures result in inconsistent shapes of the MA. The inconsistent failures can result in variously shaped MA's on a connected pair of sheets, such as square, duofold, unifold or other shapes depending on the failure mode of the projections, the manner in which the force is applied and other factors. Inconsistent buckling and variations in the positive locks of the projections or truncated cones 1 are undesirable for securing the sheets together, as such inconsistency impacts connection strength and consistency of the MA connection between engaged sheets. It is desirable to design, develop, construct and implement an MA feature that consistently and repeatably buckles when nested and crushed and, preferably, under reduced force compared to the prior art MA truncated cones 1, to connect the sheets. The preferred present invention addresses the shortcomings of the prior art MA truncated cones 1, as is described herein.

BRIEF SUMMARY OF THE INVENTION

A mechanical assembly ("MA") feature containing an inconsistency or defect in the side wall that provides an improved projection-depression coupling requiring reduced force to make the connection while providing increased connection strength and reduced variation or standard deviation in the strength of the connection over known MA features, such as those described in the '427 patent, is described herein.

The preferred embodiment of the invention is related to the design of the nestable feature or projection in an MA that is crushed to form the MA positive lock, attachment or rivet. The basic concept came from the fact that a soda can is able to support significant weight, such as the weight of a person, however, when the sides of the can are deformed by an outside influence, such as squeezing the sidewalls of the can inwardly with your fingers, the can suddenly collapses under the weight, such as the weight of the person. An intentional defect, discontinuity or failure area is preferably designed into the sidewall of the MA feature to cause predictable failure of the nested MA feature during assembly of sheets. The preferred invention takes advantage of the failure mode of the cone or projection during crushing of two nested cones or projections to form an improved projection-depression coupling or positive lock for connecting adjacent sheets. The preferred invention provides a nominal defect in the side wall of each of the nested MA cones to control the failure mode that results in a higher-strength repeatable projection-depression coupling and, therefore, a more consistent connection, positive lock or coupling.

One benefit of the preferred invention is that the projection-depression coupling has improved strength over the prior art that does not incorporate the defect. This increases the overall strength of the resulting products such as contact bodies, louvers, drift eliminators, tube settlers, submerged fixed film media, and trickling filter media that are constructed using the preferred MA attachment features, generally a plurality of the preferred MA attachments. Another benefit of the preferred invention is that less force is required to crush a feature of similar size when compared to the prior art MA feature or projection without the defect. The lower force requirement reduces the design strength of the assembly equipment used to crush the nested MA cones or projections, thereby reducing the cost of the assembly equipment through lower structural design requirements or reduced wear and tear on the assembly equipment due to lower force requirements for forming the MA. The preferred invention also allows for products with more than two nested sheets to be assembled on standard or current MA assembly equipment that was designed for the prior art crush force. Another benefit of the preferred invention is that the standard deviation of the test data for the preferred MA cone or projection with the defect is significantly less than that of the standard deviation of the prior art MA cone without the defect. Additionally, poor or inconsistent projection-depression coupling may necessitate post-manufacturing repair. If the nested cones do not fail similarly, then the infinite variations in the final connection geometry of the prior art crushed cones or projections can cause a lack of connection of the sheets or failure during handling. The repairs are typically performed using a solvent-based glue that the prior art MA method of connecting the structure was intended to replace. An analysis of the test data from the preferred MA connection shows that the average strength of the connection increases or at worst remains the same for various defect designs, but the standard deviation of the sample pool is significantly lower than the prior art MA cone performance. Both individually or the combination of the effects of increased average strength and lower standard deviation provide a product that has higher performance and fewer repairs.

In an assembly configuration, the nested truncated cones must have slight size variations of one another to obtain complete contact nesting. Two variations of size emerge and are referenced as male and female. When nested for assembly, the inside surface or walls of the female truncated cone become proximate to the outside surface or walls of the male truncated cone from the adjacent sheet. Since the dimensions of the inside surface of the female truncated cone and outside surface of the male truncated cone must be in direct alignment across all surfaces, the dimensions of the male truncated cone are less than the dimensions of the female truncated cone to account for the gauge in the thermoformed truncated cones. Homogeneous cones will not nest properly and cause a reduction in strength if assembled Due to the nature of shipping and storage of these sheets, the stacked alignment of the sheets creates a homogenous nest of male or female truncated cones. Depending on the size and shape of the discontinuity of the preferred invention, the resulting nested cones can lead to drastic changes in the overall stack height of the sheets for storage and shipping. Variations in the design of the preferred invention configurations or embodiments allow for moderate, homogeneous stack heights which can result in less of an improvement in strength. Therefore, different configurations of the discontinuities can be utilized for different applications depending on whether the sheets will be immediately assembled or stored for shipping. For instance, a discontinuity design that does not support stacking for shipping would not be used if sheets were to be stored or shipped; however, this may be the selected design for a product that is made directly from raw material and completed in forming and assembly to a finished assembled fill configuration.

Briefly stated, the preferred present invention is directed to a mechanical assembly for securing a first sheet to a second sheet to form a pack assembly, typically with additional sheets, such as a third sheet, a fourth sheet, a fifth sheet, etc. The mechanical assembly includes a first projection having a first sidewall and a first top wall. The first sidewall extends from the first top wall at a first acute angle (See FIGS. 3 and 4). The first sidewall includes a first top end and a first bottom end. A first discontinuity is defined in the first sidewall between the first top end and the first bottom end. A first base wall extends from the first bottom end. The first base wall is generally parallel to the first top wall.

In another aspect, the preferred invention is directed to a mechanical assembly for securing a first sheet to a second sheet, but is not so limited and may secure a plurality of sheets together to form a pack assembly by engaging a plurality of mechanical assemblies on the sheets. The mechanical assembly includes a first projection extending from a first base wall of the first sheet and a second projection extending from a second base wall of the second sheet. The first projection includes a first sidewall and a first top wall. The first sidewall extends from the first base wall at a first acute angle. A first discontinuity is defined in the first sidewall between the first top wall and the first base wall. The second projection includes a second sidewall and a second top wall. The second sidewall extends from the second base wall at a second acute angle. A second discontinuity is defined in the second sidewall between the first top wall and the second base wall. The second projection is nestable in the first projection in a nested configuration with the first discontinuity positioned adjacent to the second discontinuity.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 1 is a side elevational view of a prior art mechanical assembly in an idealized locked configuration in solid lines and a nested configuration in dashed lines;

FIG. 2 is a side elevational view of a first projection of a first sheet of a mechanical assembly in accordance with a first preferred embodiment of the present invention;

FIG. 3 is a cross-sectional view of the first projection and first base wall of FIG. 2, taken along line 3-3 of FIG. 2;

FIG. 4 is a cross-sectional view of the first projection and first base wall of FIG. 2 in a nested configuration with a second projection and a second base wall of a second sheet of the first preferred embodiment;

FIG. 5 is a side elevational view of a first projection of a first sheet of a mechanical assembly in accordance with a second preferred embodiment of the present invention;

FIG. 6 is a cross-sectional view of the first projection and first base wall of FIG. 5, taken along line 6-6 of FIG. 5;

FIG. 8 is a side elevational view of a first projection of a first sheet of a mechanical assembly in accordance with a third preferred embodiment of the present invention;

FIG. 9 is a cross-sectional view of the first projection and first base wall of FIG. 8, taken along line 9-9 of FIG. 8;

FIG. 11 is side elevational view of a first projection of a first sheet of a mechanical assembly in accordance with a fourth preferred embodiment of the present invention;

FIG. 12 is a cross-sectional view of the first projection and first base wall of FIG. 11, taken along line 12-12 of FIG. 11;

FIG. 12A is a graphical representation of angles of a sidewall of the first projection of FIG. 11;

FIG. 13 is a cross-sectional view of the first projection and first base wall of FIG. 11 in a nested configuration with a second projection and a second base wall of a second sheet of the fourth preferred embodiment;

DETAILED DESCRIPTION OF THE INVENTION

Figure 1A:
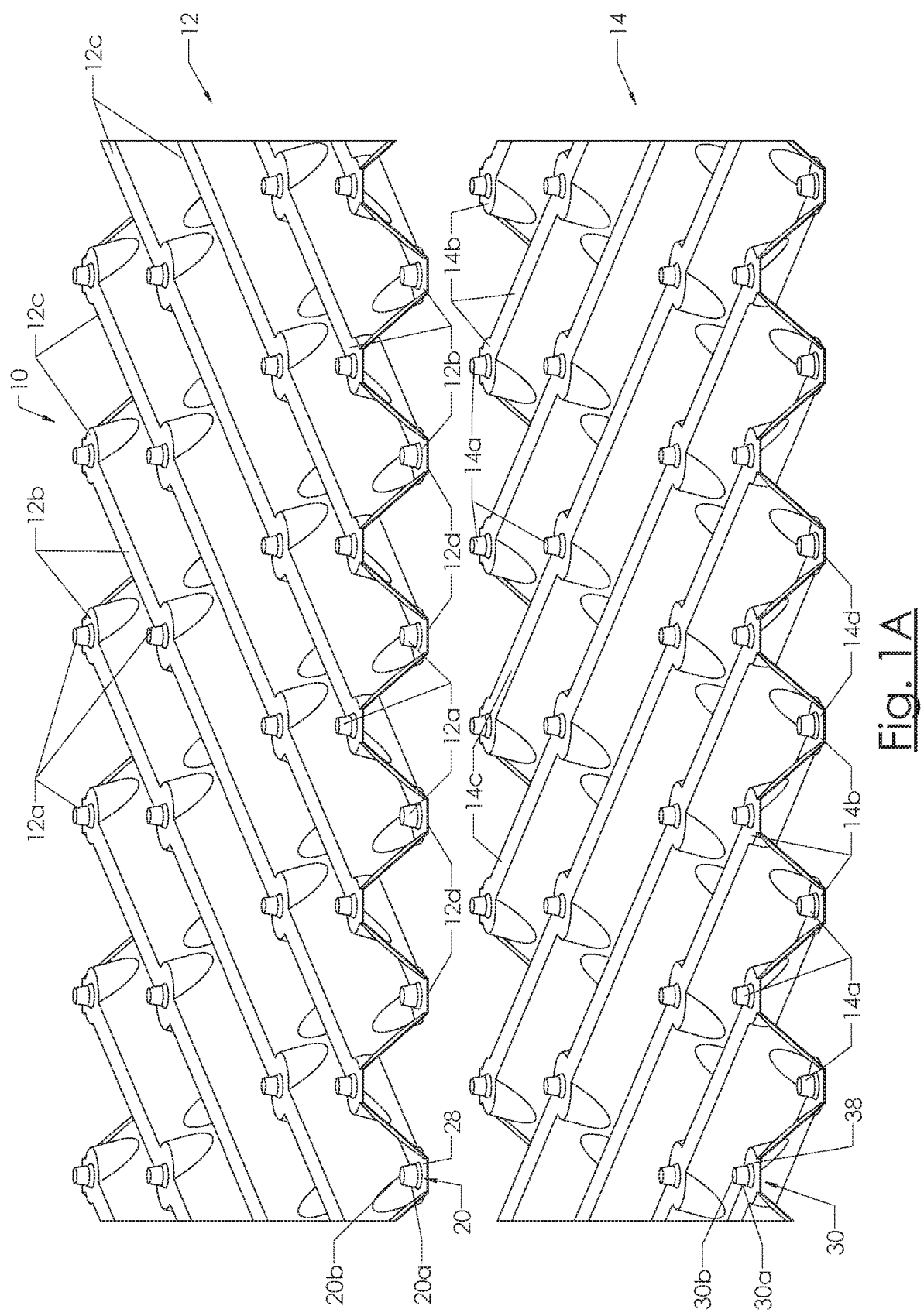
FIG. 1A is a side elevational view of first and second sheets in an exploded configuration having first and second pluralities of projections for mechanical assemblies in accordance with preferred embodiments of the present invention.

Certain terminology is used in the following description for convenience only and is not limiting. Unless specifically set forth herein, the terms "a", "an" and "the" are not limited to one element but instead should be read as meaning "at least one". The words "right," "left," "lower," and "upper" designate directions in the drawings to which reference is made. The words "inwardly" or "distally" and "outwardly" or "proximally" refer to directions toward and away from, respectively, the geometric center or orientation of the mechanical assembly, the sheets and related parts thereof. The terminology includes the above-listed words, derivatives thereof and words of similar import.

It should also be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally the same or similar, as would be understood by one having ordinary skill in the art. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to FIGS. 1A-14, the preferred invention is directed to a mechanical assembly, generally designated 10, for securing a first sheet 12 to a second sheet 14. The first sheet 12 preferably includes a first plurality of projections 12a extending from an upper surface 12b and the second sheet 14 preferably includes a second plurality of projections 14a extending from an upper surface 14b. The first sheet 12 also preferably includes a series of peaks 12c and a series of valleys 12d and the second sheet 14 includes a series of peaks 14c and a series of valleys 14d. The first plurality of projections 12a preferably extend from the upper surface 12b on the peaks 12c and valleys 12d and the second plurality of projections 14a preferably extend from the upper surface 14b on the peaks 14c and the valleys 14d. The first and second sheets 12, 14 are not limited to these specific configurations, as shown in FIG. 1A and described herein, but the first and second sheets 12, 14 are preferably so constructed such that flow channels are defined between the first and second sheets 12, 14 in an assembled configuration, wherein the sheets 12, 14 are secured together, potentially with additional sheets, to define pack assemblies or assembled sheets.

In the preferred embodiments, the first and second sheets 12, 14 are constructed of a polymeric material, preferably a thermoformed thermoplastic material, but are not so limited. The first and second sheets 12, 14 may be constructed of a variety of mechanically deformable materials. The material is preferably capable of being mechanically deformable, such that upon crimping, crushing or other type of mechanical deformation, the deformed material retains its deformed shape. The preferred material of the first and second sheets 12, 14 may be comprised of an elastomeric, polymeric or metallic material that is able to take on the general size and shape of the first and second sheets 12, 14, with stand the normal operating conditions of the first and second sheets 12, 14 and perform the functions of the first and second sheets 12, 14, as is described herein. The preferred material for the first and second sheets 12, 14 may be comprised of sheet metals, thermoplastics, and composite materials comprised of fibers impregnated with thermoplastic materials that can be used to form the sheets for use in the present invention. Sheet metal materials for the first and second sheets 12, 14 may include galvanized steel, stainless steel, aluminum and copper. Thermoplastic materials that may be utilized to form the first and second sheets 12, 14 include polyvinyl chlorides (plasticized or unplasticized), polystyrenes, acetals, nylons, acrylonitrile-butadiene-styrene ("ABS"), styrene-acrylonitrile ("SAN"), polyphenylene oxides, polycarbonates, polyether sulfones, polyaryl sulfones, polyethylene, polystyrene, terephthalates, polyetherketones, polypropylenes, polysilicones, polyphenylene sulfides, polyionomers, polyepoxides, polyvinylidene halides, and derivatives and/or mixtures thereof. The preferred material for construction of the first and second sheets 12, 14 may be dependent upon the desired end use, the size and shape of the sheets 12, 14 and the application conditions associated with the use of the sheets 12, 14. For example, in relatively low temperature cooling tower applications, a polyvinylchloride resin having little or no plasticizer may be utilized to form the sheets 12, 14. A synthetic polymer, such as polyvinylchloride, polypropylene, ABS, or polystyrene, may be used to form the sheets 12, 14 in other applications. The first and second sheets 12, 14 may be constructed of nearly any material that is able to take on the general size and shape of the first and second sheets 12, 14, withstand the normal operating conditions of the first and second sheets 12, 14 and perform the preferred functions of the first and second sheets 12, 14, as is described herein.

Referring to FIGS. 1A-4, in a first preferred embodiment, the first sheet 12 includes a first projection 20 having a first sidewall 20a and a first top wall 20b. The first sidewall 20a extends from the first top wall 20b at a first acute angle $A_1$. In the first preferred embodiment, the first acute angle $A_1$ is approximately seventy to eighty-seven degrees (70-87°) and the first projection 20 has the shape of a generally truncated cone or an overturned cup with a flat bottom or top wall 20b. The first projection 20 is not limited to extending from the first top wall 20b at the first acute angle $\Delta_1$ or to having the shape of a generally truncated cone and may have a broader range of first acute angles $\Delta_1$. For example, the first acute angle $\Delta_1$ may be in the range of approximately forty-five to eighty-nine degrees (45-89°) and the first sidewall 20a may have a generally arcuate shape that transitions to an arcuate or flat top wall 20b. The first projection 20, however, preferably is sized and shaped for nesting with an opposing projection, as is described in greater detail below.

The first sidewall 20a also preferably extends from the first base wall 28 at a second acute angle $\Delta_2$ such that the first bottom end 23 meets with the first top end 22 at the first discontinuity 24. The second acute angle $\Delta_2$ is approximately fifty to seventy degrees (50-70°) in the first preferred embodiment and, may be comprised of approximately sixty degrees (60°) in a preferred configuration. The first acute angle $\Delta_1$ is preferably greater than the second acute angle $\Delta_2$ in the first preferred embodiment, such that the bottom of the first projection 20 has a relatively wide opening proximate the first base wall 28 for acceptance of the second projection 30 for nesting. The first projection 20 is not limited to extending from the first base wall 28 at the second acute angle $\Delta_2$ or to having the relatively wide opening proximate the first base wall 28 and may have a broader range of second acute angles $\Delta_2$. For example, the second acute angle $\Delta_2$ may be in the range of approximately forty to eighty-seven degrees (40-87°) and the first sidewall 20a may have a generally arcuate shape that transitions to the first base wall 28.

The first sidewall 20a of the first preferred embodiment includes a first top end 22 and a first bottom end 23, as well as a first discontinuity 24 defined in the first sidewall 20a between the first top end 22 and the first bottom end 23. In the first preferred embodiment, the first discontinuity 24 is comprised of an indentation or change in slope between the first top end 22 and the first bottom end 23 that extends circumferentially around the entire first sidewall 20a separating the first top end 23 from the first bottom end 23. The first discontinuity 24 is substantially defined by the change in slope of the first sidewall 20a between the first top end 22 and the first bottom end 23. The first discontinuity 24 is designed to fail or buckle consistently when the first projection 20 is crushed during assembly, as will be described in greater detail below. The first discontinuity 24 provides repeatability during assembly when compared to the prior art projections 1, thereby increasing the strength of the assembled first and second sheets 12, 14 or pack assemblies, while also requiring less force to crush the first projection 20, thereby reducing the structural requirements and wear and tear for tooling and mechanisms that are designed to crush the first projection 20. The consistent or repeatable failure mode of the preferred first discontinuity 24 provides a known failure mode during crushing or assembly by failing the projections 12a, 14a in a known and repeatable manner through a stress concentration exceeding the elastic strain limit of the material locally at the discontinuity 24. The first discontinuity 24 is not limited to the specifically identified change in slope between the first top end 22 and the first bottom end 23 or to extending substantially circumferentially around the entire first projection 20, as will be described below. The first discontinuity 24, however, is preferably constructed such that pairs of the first projection 20 are stackable or nestable (FIG. 4), as is described in greater detail below.

The mechanical assemblies of the first sheet 12, each preferably include a first base wall 28 extending from the first bottom end 23 of the first sidewall 20a. The first base wall 28 preferably extends generally parallel to the first top wall 20b and is defined around the entire first bottom end 23. The first bottom end 23 preferably extends at the second acute angle $\Delta_2$ from the first base wall 28 and at the first acute angle $\Delta_1$ from the first top wall 20b, but is not so limited and may otherwise extend or may be partially discontinuous with the first base wall 28 or the first top wall 20b. The first base wall 28 is preferably positioned in one of the valleys 12d of the first sheet 12, along with a plurality of valley projections of the first projections 12a on the first sheet 12 that extend from different portions of the valleys 12d, preferably all extending toward the peaks 12c in the same direction and having the same general shape and configuration. The plurality of valley projections of the first projections 12a on the first sheet 12 preferably comprise approximately half of the first plurality of projections 12a with a plurality of peak projections of the first projections 12a comprising the other approximate half of the first plurality of projections 12a. In the first preferred embodiment, the first base wall 28 is positioned generally parallel relative to the first top wall 20b. The first top end 22 of the first sidewall 20a preferably extends from the first top wall 20b at the first acute angle $\Delta_1$. The first acute angle $\Delta_1$ is preferably greater than the second acute angle $\Delta_2$, such that a lower opening of the first projection 20 is relatively wide for introduction or nesting of another first projection 20 or other projection during use. The difference in slope between the first top end 22 and the first bottom end 23 defines the first discontinuity 24 in the first preferred embodiment.

The second sheet 14 includes a second projection 30 having a second sidewall 30a and a second top wall 30b. The second sidewall 30b includes a second top end 32 and a second bottom end 33 with a second discontinuity 34 defined therebetween. The second bottom end 33 extends from the second base wall 38 at a fourth acute angle $\Theta_4$ and the second top end 32 extends from the top wall 30b at a third acute angle $\Theta_3$. In the first preferred embodiment, the first and third acute angles $\Delta_1$, $\Theta_3$ are substantially equal and the second and fourth acute angles $\Delta_2$, $\Theta_4$ are substantially equal. A second discontinuity 34 is defined in the second sidewall 30a between the second top end 32 and the second bottom end 33. The second discontinuity 34 of the first preferred embodiment extends substantially circumferentially around the second sidewall 30a. The second projection 30 has a similar or substantially the same design and construction as the first projection 20 such that the second projection 30 is positionable or nestable within the first projection 20 in the nested configuration (FIG. 4). The second discontinuity 34 is also substantially designed and configured in the same or a similar manner to the first discontinuity 24 such that both the first and second projections 20, 30 buckle, crumple or fail at the first and second discontinuities 24, 34 when a force is applied to the first and second top ends 22, 32 or the first top wall 20b to collapse the first and second sidewalls 20a, 30a and to define the crushed mechanical assembly, generally in the form of a rivet.

The second sheet 14 also includes a second base wall 38 extending from the second bottom end 33 of the second projection 30. The second base wall 38 extends generally parallel to the second top wall 30b and the second sidewall 30a or second bottom end 33 extends from the second base wall 38 at the fourth acute angle $\Theta_4$. The second projection 30 is nestable within the first projection 20 such that the second top wall 30b is positioned proximate the first top wall 20b and the second sidewall 30a is positioned proximate the first sidewall 20a in the nested configuration (FIG. 4). The first and second discontinuities 24, 34 are also preferably positioned proximate to each other or are generally aligned in the nested configuration. The first and second top walls 20b, 30b and the first and second sidewalls 20a, 30a are preferably positioned in facing engagement in the nested configuration, but are not so limited and may be slightly separated or spaced in the nested configuration, as long as the first and second projections 20, 30 are positioned such that they engage each other following crushing to secure the first sheet 12 to the second sheet 14 in a crushed configuration, generally in the form of a rivet.

The second base wall 38 is a generally planar wall positioned around the second bottom end 33 of the second projection 30 and is preferably located on one of the peaks 14c of the second sheet 14. The second projection 30 is preferably one of the second plurality of projections 14a on the second sheet 14 that comprise approximately one-half of the second plurality of projections 14a on the second sheet 14, with the other half of the second plurality of projections 14a positioned on the valleys 14d.

In an assembled configuration, the upper surfaces 14b of the peaks 14c of the second sheet 14 come into contact with lower surfaces of the valleys 12d such that the second projection 30 is positioned or nested within the first projection 20 in the nested configuration and the projections on the peaks 14c of the second plurality of projections 14a are positioned within the projections on the valleys 12d of the first plurality of projections 12a, thereby forming flow channels between the valleys 14d of the second sheet 12 and the peaks 12c of the first sheet. The respective projections of the first and second plurality of projections 12a, 14a in the nested configuration laterally secure the first and second sheets 12, 14 together in the assembled configuration. These projections, including the first and second projections 20, 30, of the first and second plurality of projections 12a, 14a in the nested configuration are subsequently crushed by applying a force downwardly on the first and second top walls 20b, 30b sufficient to buckle the first and second sidewalls 20a, 30a, as well as the sidewalls of the other nested projections. The first and second discontinuities 24, 34 provide consistent failure of the first and second sidewalls 20a, 30a and buckling or deformation of the first and second projections 20, 30 when crushed, thereby forming relatively consistent crushed projections 12a, 14a, 20, 30 to secure the first sheet 12 to the second sheet 14, both laterally and vertically or out-of-plane relative to the first and second base walls 28, 38. The first and second discontinuities 24, 34 also result in crushing and failure of the projections 20, 30, 12a, 14a at a lower force than the prior art projections 1, resulting in less reaction forces applied to tools used to crush the projections 20, 30, 12a, 14a and a lighter tool design requirements.

In the nested configuration, the first base wall 28 is positioned proximate to the second base wall 38, preferably in facing engagement with each other, and the first and second base walls 28, 38 are supported when the force is applied to the first and second top walls 20b, 30b. When sufficient force is applied, the first and second sidewalls 20a, 30a, as well as the sidewalls of each of the first and second plurality of projections 12a, 14a that are in the nested configuration and the force is applied, buckle at the first and second discontinuities 24, 34 and related discontinuities, to form the rivet-like connections. Each of the nested projections of the first and second plurality of projections 12a, 14a in the assembled configuration may not be crushed to secure the first and second sheets 12, 14 together, such as by only crushing projections at the edges of the first and second sheets 12, 14 or a select number of the nested first and second plurality of projections 12a, 14a.

In the first preferred embodiment, the first and second discontinuities 24, 34 are comprised of a single discontinuity formed circumferentially around the first and second sidewalls 20a, 30a, respectively, and aligned in the nested configuration. The first and second discontinuities 24, 34 are not limited to being comprised of the discontinuities, as shown in FIGS. 2-4 and described herein, formed circumferentially around the sidewalls 20a, 30a, and may be comprised of otherwise designed and configured discontinuities that are not aligned in the nested configuration. The first and second discontinuities 24, 34 may take on nearly any size and shape that may be associated with the first and second sidewalls 20a, 30a and cause the first and second projections 20, 30 to consistently fail when the force is applied to the first and second top walls 20b, 30b. For example, the first and second discontinuities 24, 34 may be comprised of holes or stress concentrations embedded or formed in the first and second sidewalls 20a, 30a that result in consistent crushing, buckling or crumpling of the first and second projections 20, 30 when the crushing force is applied in the nested configuration. Each of the first and second plurality of projections 12a, 14a of the first and second sheets 12, 14 are designed and configured substantially the same or the same as the first and second projections 20, 30 in the first preferred embodiment, but are not so limited and certain of the first and second plurality of projections 12a, 14a may be otherwise designed and configured based on designer and user preferences, such as to provide particularly strength or stiffness features at particular portions of the assembled first and second sheets 12, 14 or for other design considerations.

The first and second sheets 12, 14 are also not limiting and alternative assemblies may include additional sheets (not shown) that may be stacked onto or assembled onto the first and/or second sheets 12, 14 to define larger assemblies of sheets with similar pluralities of projections extending therefrom that may be positioned in the nested configuration. Assemblies of the pluralities of the sheets 12, 14 may be described as a pack that ultimately defines a contact body, as would be apparent to one having ordinary skill in the art based on a review of the present disclosure. The assemblies may alternatively be described as louvers, drift eliminators, tube settlers, submerged fixed film media, trickling filter media or related assemblies comprised of a plurality of the sheets 12, 14 assembled together.

Figure 7:
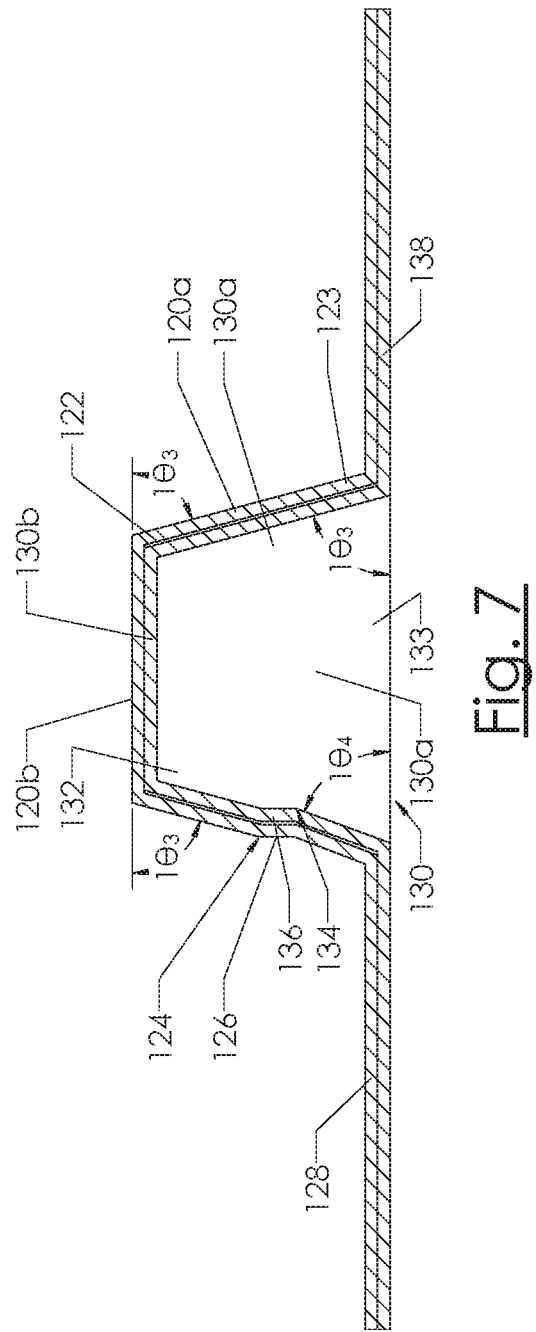
FIG. 7 is a cross-sectional view of the first projection and first base wall of FIG. 6 in a nested configuration with a second projection and a second base wall of a second sheet of the second preferred embodiment.

Referring to FIGS. 5-7, a second preferred embodiment of first and second projections 120, 130 has similarities to the first preferred embodiment of the first and second projections 20, 30 and like reference numerals are utilized to identify like features, with a "1" prefix utilized to distinguish the second preferred embodiment of the first and second projections 120, 130 from the first preferred first and second projections 20, 30. The second preferred first and second projections 120, 130 include first and second top walls 120b, 130b, first and second sidewalls 120a, 130a and first and second base walls 128, 138, respectively. The first and second sidewalls 120a, 130a include first and second top ends 122, 132 and first and second bottom ends 123, 133, respectively. The first and second projections 120, 130 of the second preferred embodiments may be incorporated into the first and second sheets 12, 14 for defining sheet assemblies, such as louvers, drift eliminators, tube settlers, submerged fixed film media, trickling filter media or related assemblies, as is the case with each of the preferred embodiments of the present invention.

The first sidewall 120a of the second preferred embodiment includes a first discontinuity 124 defined in a limited circumferential portion of the first sidewall 20a between the first top end 22 and the first bottom end 23. In the second preferred embodiment, the first discontinuity 124 is comprised of an indentation in the first sidewall 20a that is relatively sharp near the midpoint of the first sidewall 20a and then tapers toward the first base wall 128. The first discontinuity 124 of the second preferred embodiment has a first middle leg 126 that extends substantially perpendicularly relative to the top wall 20b and then transitions to the tapering or angled first bottom end 123. The middle leg 126 extends substantially perpendicularly or at a slight taper to the top end 120b. The first discontinuity 124 is substantially defined by a change in slope of the first sidewall 120a between the first top end 122 and the first bottom end 123. The first discontinuity 124 is designed to fail or buckle consistently when the first projection 20 is crushed during assembly. The first discontinuity 124 of the second preferred embodiment provides repeatability during assembly when compared to the prior art projections 1, thereby increasing the strength of the assembled first and second sheets 12, 14 or pack assemblies, while also requiring less force to crush the first projection 120, thereby reducing the structural requirements and wear and tear for tooling and mechanisms that are designed to crush the first projection 120. The consistent or repeatable failure mode of the preferred first discontinuity 124 provides a known failure mode during crushing or assembly by failing the projections 12a, 14a in a known and repeatable manner through a stress concentration exceeding the elastic strain limit of the material locally at the discontinuity 124. The first middle leg 126 is not limited to extending at a slight taper relative to the top wall 120b and may extend at another angle, preferably perpendicularly or slightly away from an internal space of the first projection 120 such that pairs of the first projection 120 are stackable or nestable (FIG. 7).

The first sidewall 120a of the second preferred embodiment extends from the first top wall 120b at the first acute angle $1\Delta_1$. In the second preferred embodiment, the first acute angle $1\Delta_1$ is approximately seventy to eighty degrees (70-80°) and the first projection 20 has the shape of a generally truncated cone or an overturned cup with a flat bottom or top wall 20b. The first projection 20 is not limited to extending from the first top wall 20b at the first acute angle $1\Delta_1$ or to having the shape of a generally truncated cone and may have a broader range of first acute angles $1\Delta_1$. For example, the first acute angle $1\Delta_1$ may be in the range of approximately forty-five to eighty-seven degrees (45-87°) and the first sidewall 20a may have a generally arcuate shape that transitions to an arcuate or flat top wall 20b. The first sidewall 120a also preferably extends from the first base wall 128 at the second acute angle $1\Delta_2$ that is measured at or near the first discontinuity 124. The second acute angle $1\Delta_2$ is preferably substantially the same or slightly smaller than the first acute angle $1\Delta_1$ with the first sidewall 120a extending from the first base wall 128 at the first acute angle $1\Delta_1$ in portions spaced from the first discontinuity 124. The first projection 20 is preferably sized and shaped for nesting with an opposing projection, as is described in greater detail below.

In the second preferred embodiment, the first discontinuity 124 is comprised of an indentation in the first sidewall 120a that is relatively sharp near the midpoint of the first sidewall 120a and then tapers toward the first bottom end 123. The first discontinuity 124 of the second preferred embodiment has a first middle leg 126 that extends substantially perpendicularly relative to the top wall 120b and then transitions to the tapering or angled first bottom end 123. The first discontinuity 124 is substantially defined by a change in slope of the first sidewall 120a between the first top end 122 and the first bottom end 123 at one portion of the first sidewall 120a. The first discontinuity 124 is designed to fail or buckle consistently when the first projection 120 is crushed or buckled during assembly. The first discontinuity 124 provides repeatability during assembly when compared to the prior art projections 1, thereby increasing the strength of the assembled first and second sheets 12, 14 or pack assemblies, while also requiring less force to crush the first projection 120, thereby reducing the structural requirements and wear and tear for tooling and mechanisms that are designed to crush the first projection 120. The consistent or repeatable failure mode of the preferred first discontinuity 124 provides a known failure mode during crushing or assembly by failing the projections 12a, 14a in a known and repeatable manner through a stress concentration exceeding the elastic strain limit of the material locally at the discontinuity 124. The first middle leg 126 is not limited to extending substantially perpendicularly relative to the top wall 120b and may extend at another angle, preferably perpendicularly or slightly away from an internal space of the first projection 120 such that pairs of the first projection 120 are stackable or nestable (FIG. 7).

The second sheet 14 of the second preferred embodiment includes the second projection 130 having the second sidewall 130a and the second top wall 130b, wherein the second sidewall 130a extends from the second top wall 130b at the third acute angle $1\Theta_3$. The second sidewall 130a also preferably extends from the second base wall 138 at the fourth acute angle $1\Theta_4$. The second sidewall 130a includes the second top end 132 and the second bottom end 133. The second discontinuity 134 is defined in the second sidewall 130a between the second top end 132 and the second bottom end 133. The second discontinuity 134 of the second preferred embodiment includes the second middle leg 136 that extends along a portion of the second side wall 130a between the second top end 132 and the second bottom end 133, generally perpendicular to the second top wall 130b. The second projection 130 has a similar or substantially the same design and construction as the first projection 120 such that the second projection 130 is positionable or nestable within the first projection 120 in the nested configuration (FIG. 7). The second discontinuity 134 is also substantially designed and configured in the same or a similar manner to the first discontinuity 124 such that both the first and second projections 120, 130 buckle, crumple or fail at the first and second discontinuities 124, 134 when a force is applied to the first and second top ends 122, 132 or the first top wall 120b to collapse the first and second sidewalls 120a, 130a and to define the crushed mechanical assembly, generally in the form of a rivet.

In an assembled or nested configuration, the second projection 130 is positioned or nested within the first projection 120 and the projections on the peaks 14c of the second plurality of projections 14a are positioned within the projections on the valleys 12d of the first plurality of projections 12a, thereby forming flow channels between the valleys 14d of the second sheet 12 and the peaks 12c of the first sheet 12. The nested first and second projections 120, 130 are subsequently crushed by applying a force downwardly on the first and second top walls 120b, 130b sufficient to buckle the first and second sidewalls 120a, 130a. The first and second discontinuities 124, 134 provide consistent failure of the first and second sidewalls 120a, 130a and buckling, crumpling or deformation of the first and second projections 120, 130 when crushed, thereby forming relatively consistent crushed projections 120, 130 to secure the first sheet 12 to the second sheet 14, both laterally and vertically or out-of-plane relative to the first and second base walls 128, 138. The first and second discontinuities 124, 134 also result in crushing and failure of the projections 120, 130 at a lower force than the prior art projections 1, resulting in less reaction forces applied to tools used to crush the projections 120, 130.

In the second preferred embodiment, the first and second discontinuities 124, 134 are comprised of a single discontinuity formed at one side on the first and second sidewalls 120a, 130a, respectively, and aligned in the nested configuration. The first and second discontinuities 124, 134 are not limited to being comprised of the discontinuities, as shown in FIGS. 5-7 and described herein, formed at one side of the sidewalls 120a, 130a with the first and second middle legs 126, 136, respectively, and may be comprised of otherwise designed and configured discontinuities that are not aligned in the nested configuration. The first and second discontinuities 124, 134 may take on nearly any size and shape that may be associated with the first and second sidewalls 120a, 130a and cause the first and second projections 120, 130 to consistently fail when the force is applied to the first and second top walls 120b, 130b. Each of the first and second plurality of projections 12a, 14a of the first and second sheets 12, 14 are designed and configured substantially the same or the same as the first and second projections 120, 130 in the second preferred embodiment, but are not so limited and certain of the first and second plurality of projections 12a, 14a may be otherwise designed and configured based on designer and user preferences.

Figure 10:
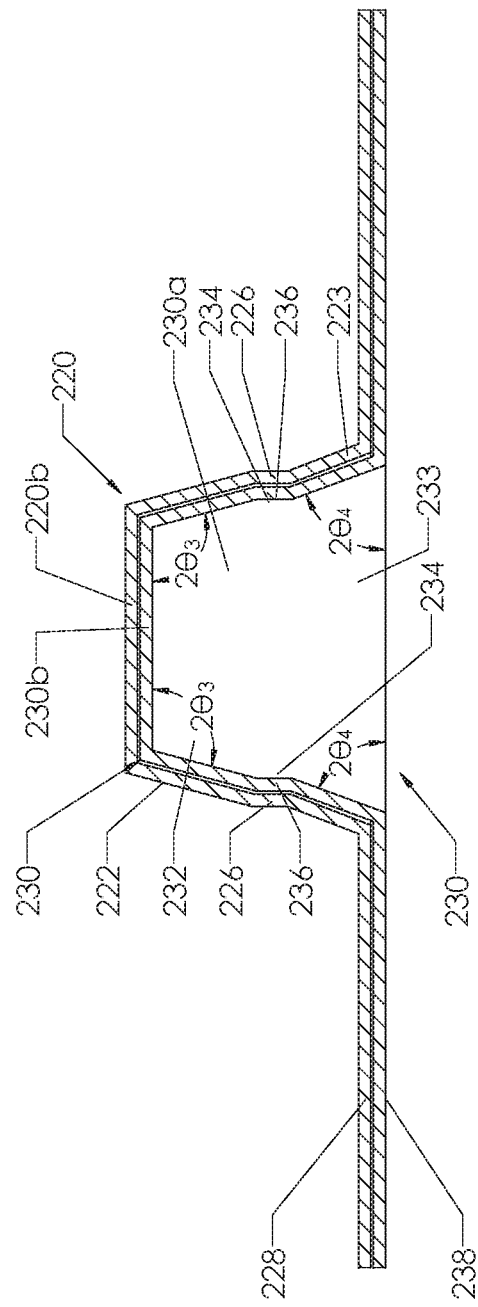
FIG. 10 is a cross-sectional view of the first projection and first base wall of FIG. 9 in a nested configuration with a second projection and a second base wall of a second sheet of the third preferred embodiment.

Referring to FIGS. 8-10, a third preferred embodiment of first and second projections 220, 230 has similarities to the first and second preferred embodiments of the first and second projections 20, 30, 120, 130 and like reference numerals are utilized to identify like features, with a "2" prefix utilized to distinguish the third preferred embodiment of the first and second projections 220, 230 from the first and second preferred first and second projections 20, 30, 120, 130. The third preferred first and second projections 220, 230 include first and second top walls 220b, 230b, first and second sidewalls 220a, 230a and first and second base walls 228, 238, respectively. The first and second sidewalls 220a, 230a include first and second top ends 222, 232 and first and second bottom ends 223, 233, respectively.

The first and second discontinuities 224, 234 of the second preferred embodiment are comprised of a pair of opposing discontinuities or depressions 224, 234 on the first and second projections 220, 230, respectively. The opposing discontinuities or depressions 224, 234 are preferably positioned at midpoints of the first and second sidewalls 220a, 230a, respectively, between the first and second top ends 222, 232 and the first and second bottom ends 223, 233, respectively. The discontinuities 224, 234 are substantially comprised of changes in slope of the first and second sidewalls 220a, 230a. The opposing first and second discontinuities 224, 234 each include the middle legs 226, 236. The projections 220, 230 are not limited to each including the opposing pair of discontinuities 224, 234 and may include more than two discontinuities 224, 234 spaced around the circumference of the projections 220, 230 or a plurality of projections 220, 230 positioned at various locations around and along the first and second sidewalls 220a, 230a. The first and second discontinuities 224, 234 of the second preferred embodiment preferably provide consistent and a comparatively low force to crush the projections 220, 230 into the crushed or rivet-like positive locks.

In the third preferred embodiment, the first and second sidewall 220a, 230a extend from the first and second top walls 220b, 230b at the first and third acute angles $2\Delta_1$, $2\Theta_3$, which are preferably substantially equal. The first and second sidewalls 220a, 230a also preferably extend from the first and second base walls 228, 238 at the second and fourth acute angles $2\Delta_2$, $2\Theta_4$, which are also preferably, substantially equal, although none of the acute angles $2\Delta_1$, $2\Theta_3$, $2\Delta_2$, $2\Theta_4$ are so limited and may be sized and configured based on designer preferences or for performance purposes.

Referring to FIGS. 11-13, a fourth preferred embodiment of first and second projections 320, 330 has similarities to the first, second and third preferred embodiments of the first and second projections 20, 30, 120, 130, 220, 230 and like reference numerals are utilized to identify like features, with a "3" prefix utilized to distinguish the fourth preferred embodiment of the first and second projections 320, 330. The fourth preferred first and second projections 320, 330 include first and second top walls 320b, 330b, first and second sidewalls 320a, 330a and first and second base walls 328, 338, respectively. The first and second discontinuities 324, 334 of the fourth preferred embodiment include the middle legs 326, 336 between the first and second top ends 322, 332 and the first and second bottom ends 323, 333, wherein the middle legs 326, 336 are separated from the first and second top ends 322, 332 and the first and second bottom ends 323, 333 by upper and lower arcuate portions 326a, 336a, 326b, 336b, respectively. From the first and second top walls 320b, 330b, the first and second top ends 322, 332 of the first and second sidewalls 320a, 330a extend away from the first and second top walls 320b, 330b to the upper arcuate portion 326a, 336a, to the first and second middle legs 326, 336, to the lower arcuate portions 326b, 336b, to the first bottom ends 323, 333 and then to the first and second base walls 328, 338, respectively. The first and second discontinuities 326, 336 are substantially defined by changes in slope of the first and second sidewalls 320a, 330a or inflection points between the first and second top ends 322, 332 and first and second the middle legs 326, 336, as well as between the first and second bottom ends 323, 333 and the first and second middle legs 326, 336.

The first and second top ends 322, 332 preferably extend from the top walls 320b, 330b at the first and third acute angles $3\Delta_1$, $3\Theta_3$, which are approximately fifty to sixty degrees (50-60°) in the fourth preferred embodiment. In addition, the middle legs 326, 336 of the fourth preferred embodiment preferably extend at a middle leg angle $3\Omega$ relative to a horizontal or plane of the top walls 320b, 330b of approximately seventy to eighty-seven degrees (70-87°). The first and second bottom ends 323, 333 preferably extend from the first and second base walls 328, 338 at the second and fourth acute angles $3\Delta_2$, $3\Theta_4$, which are approximately fifty to sixth degrees (50-60°) in the fourth preferred embodiment. The first, second, third and fourth acute angles $3\Delta_1$, $3\Delta_2$, $3\Theta_3$, $3\Theta_4$ and the middle leg angle $3\Omega$ are not limited to these specific angles, but these angles are preferred for the fourth preferred embodiment to facilitate stacking of pairs of the first and second projections 320, 330 and crushing the first and second projections 320, 330 into the positive locks from the nested configuration (FIG. 13).

Figure 14:
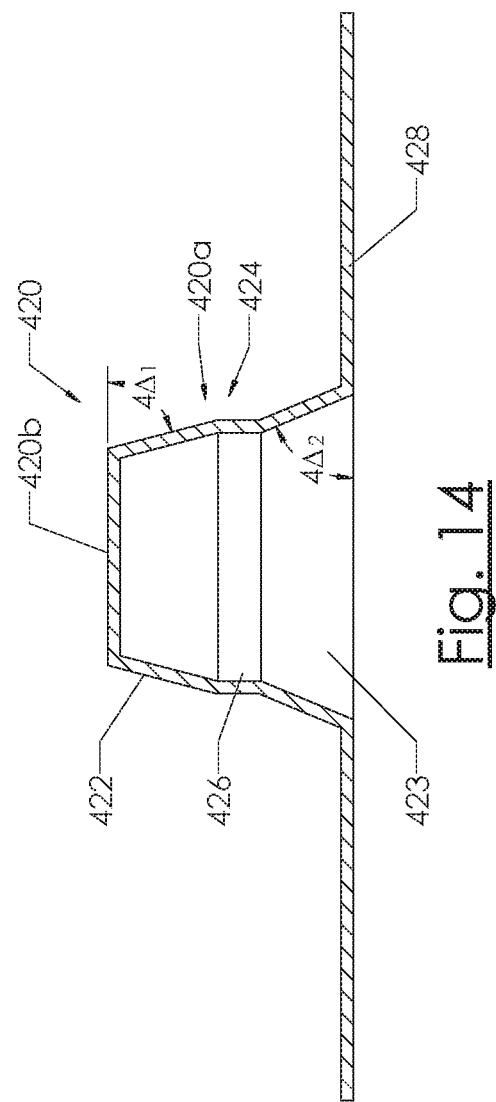
FIG. 14 is a cross-sectional view a first projection and a first base wall of a mechanical assembly in accordance with a fifth preferred embodiment of the present invention.
Figure 15:
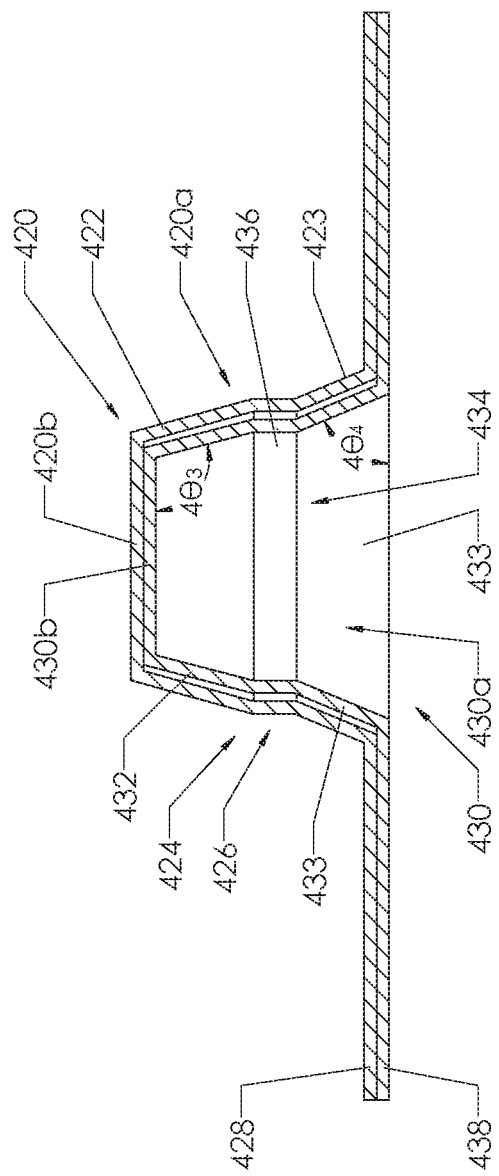
FIG. 15 is a cross-sectional view of the first projection and base wall of FIG. 14 in a nested configuration with a second projection and a second base wall of a second sheet of the fifth preferred embodiment.
Figure 16:
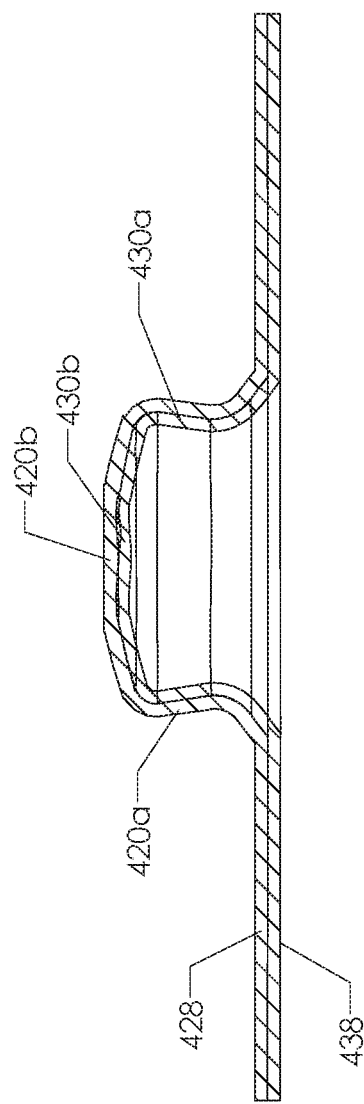
FIG. 16 is a cross-sectional view of the first and second projections and first and second base walls of FIG. 15 in a partially crushed configuration.

Referring to FIGS. 14-16, a fifth preferred embodiment of the first and second projections 420, 430 has similarities to the first, second, third and fourth preferred embodiments of the first and second projections 20, 30, 120, 130, 220, 230, 320, 330 and like reference numerals are utilized to identify like features, with a "4" prefix utilized to distinguish the fifth preferred embodiment of the first and second projections 420, 430. The fifth preferred first and second projections 420, 430 include first and second sidewalls 420a, 430a, first and second top walls 420b, 430b and first and second base walls 428, 438, respectively. The first and second discontinuities 424, 434 of the fifth preferred embodiment are comprised of middle legs 426, 436 that extend circumferentially around the entire first and second sidewalls 420a, 430a, respectively. The middle legs 426, 436 that extend substantially vertically or perpendicular to the first and second top walls 420b, 430b and the first and second base walls 428, 438 in an uncrushed configuration result in changes in slope of the first and second sidewalls 420a, 430a, thereby defining the first and second discontinuities 424, 434. The middle legs 426, 436 extend generally vertically or substantially perpendicular to a plane defined by the first and second top walls 420b, 430b and the first and second base walls 428, 438. The first and second discontinuities 424, 434 of the fifth preferred embodiment function substantially the same or similarly to the first, second, third and fourth preferred embodiments, by facilitating nesting of the first and second projections 420, 430 and consistent buckling or failure of the first and second projections 420, 430 when the crushing force is applied to the first and second top walls 420b, 430b when forming the positive locks.

The first and second top ends 422, 432 of the fifth preferred embodiment extend from the top walls 420b, 430b at the first and third acute angles $4\Delta_1$, $4\Theta_3$, which are approximately seventy to eighty-seven degrees (70-87°) in the fifth preferred embodiment. In addition, the middle legs 426, 436 of the third preferred embodiment preferably extend substantially perpendicularly relative to the first and second top walls 420b, 430b. The first and second bottom ends 423, 433 preferably extend from the first and second base walls 428, 438 at the second and fourth acute angles $4\Delta_2$, $4\Theta_4$, which are approximately sixty to eighty degrees (60-80°) in the fifth preferred embodiment. The first, second, third and fourth acute angles $4\Delta_1$, $4\Delta_2$, $4\Theta_3$, $4\Theta_4$ are not limited to these specific angles, but these angles are preferred for the fifth preferred embodiment to facilitate stacking of pairs of the first and second projections 420, 430 and crushing the first and second projections 420, 430 into the positive locks from the nested configuration (FIG. 15).

Referring to FIGS. 1A and 15-17, the operation of the preferred mechanical assemblies are described focusing on the fifth preferred embodiment, although the first, second, third and fourth preferred embodiments function in a substantially similar manner. In use, the first and second sheets 12, 14 are arranged relative to each other, such that the first plurality of projections 12a on the valleys 12d are aligned directly above the second plurality of projections 14a on the peaks 14c of the second sheet 14. The first and second sheets 12, 14 are then urged together such that the specific projections 12a, 14a, including the first and second projections 20, 30 are in the nested configuration (FIGS. 4, 7, 10, 13 and 15). A force is then applied to the top walls of the nested projections 12a, 14a, including the first and second top walls 20b, 30b. The force is preferably applied mechanically by a tool. The force is preferably sufficient to cause the sidewalls 20a, 30a to buckle and the specific projections 12a, 14a, including the first and second projections 20, 30, to deform and collapse toward the first and second base walls 28, 38, 128, 138, 228, 238, 328, 338, 428, 438.

Figure 17:
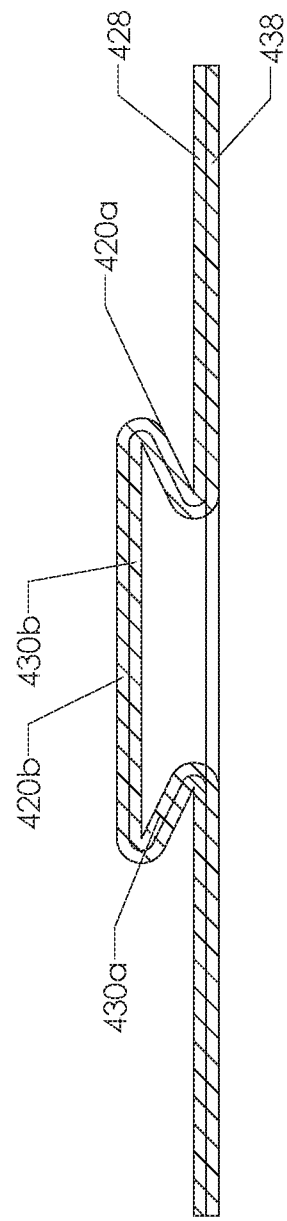
FIG. 17 is a cross-sectional view of the first and second projections and first and second base walls of FIG. 15 in a substantially locked configuration.

Referring specifically to FIGS. 15-17, during crush locking or mechanical assembly of nested first and second projections 420, 430 of the fifth preferred embodiment, the force preferably results in buckling or crumpling of the sidewalls 420a, 430a starting at the discontinuities 424, 434. The sidewalls 420a, 430a preferably fold over onto themselves while the first and second projections 420, 430 are nested within each other. This folding over results in securement or engagement of the first and second sheets 12, 14 at the collapsed and coupled projections 420, 430. The first and second projections 420, 430 may be crushed such that the first sidewall 420a does not come into facing engagement with the first base wall 428 (FIG. 17) or the sidewalls 420a, 430a may be crushed such that the first sidewall 420a is in facing engagement with the first base wall 428 in the crushed or positive lock configuration. Additional sheets (not shown) may subsequently be added to the engaged or connected first and second sheets 12, 14 by aligning and crushing additional projections on the additional sheets with the non-crushed first and second plurality of projections 12a, 14a.

The preferred projections 20, 30, 120, 130, 220, 230, 320, 330, 420, 430 are preferably configured such that the discontinuities 24, 34, 124, 134 224, 234, 324, 334, 424, 434 result in stress concentrations that exceed the elastic strain limit of the material of the projections 20, 30, 220, 230, 320, 330, 420, 430 when sufficient force is applied to the projections 20, 30, 120, 130 220, 230, 320, 330, 420, 430. The consistent failure of the projections 20, 30, 120 130 220, 230, 320, 330, 420, 430 at the discontinuities 24, 34, 124, 134 224, 234, 324, 334, 424, 434 results in repeatable strength performance of the positive locks or crushed joints to secure the first sheet 12 to the second sheet 14 and the additional sheets.

Referring to FIGS. 1-17, in the preferred embodiments, the first plurality of projections 12a includes the first projection 20, 120, 220, 320, 420, a third projection 40 and numerous additional projections. The second plurality of projections 14a includes the second projection 30, 130, 230, 330, 430, a fourth projection 42 and numerous additional projections. The third projection 40 is nested within the fourth projection 42 in the nested configuration and may be crushed to form the positive lock or rivet-like connection. Each of the first and second plurality of projections 12a, 14a are generally shaped as truncated cones in the preferred embodiments that are nestable within each other in the nested configuration.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the present disclosure and the appended claims.

We claim:

1. A mechanical assembly for securing a first sheet to a second sheet, the mechanical assembly comprising:
   a first projection extending from a first base wall of the first sheet, the first projection including a first sidewall, a first internal space and a first top wall, the first sidewall extending from the first base wall at a second acute angle, a first discontinuity defined in the first sidewall between the first top wall and the first base wall, wherein the first sidewall extends at a first taper away from the first internal space between the first top wall and the first discontinuity and extends at a second taper away from the first internal space between the first discontinuity and the first base wall, the second taper being greater than the first taper; and a second projection extending from a second base wall of the second sheet, the second projection including a second sidewall and a second top wall, the second sidewall extending from the second base wall at a fourth acute angle, a second discontinuity defined in the second sidewall between the second top wall and the second base wall, the second projection nestable in the projection in a nested configuration with the first discontinuity positioned proximate the second discontinuity that is configured to cause predictable failure of the first and second projections during assembly of the first and second sheets.

2. The mechanical assembly of claim 1, wherein the first sheet includes a third projection and the second sheet includes a fourth projection, the fourth projection nested in the third projection in the nested configuration.

3. The mechanical assembly of claim 1, wherein the first and second projections are constructed in the shape of a truncated cone.

4. The mechanical assembly of claim 1, wherein the first sidewall extends from the first top wall away from the first internal space at a first acute angle, the second acute angle being different than the first acute angle, the first sidewall including a first top end and a first bottom end, the first discontinuity defined in the first sidewall between the first top end and the first bottom end; and the first and second projections are configured to form a positive lock between the first and second sheets in the form of flattened interlocking rivets, the first and second projections buckle at the first and second discontinuities when mechanically deformed.

5. The mechanical assembly of claim 1, wherein the first discontinuity is comprised of a first depression and a second depression positioned on opposite sides of the first sidewall.

6. The mechanical assembly of claim 1, wherein the first discontinuity is comprised of a change in slope of the first sidewall between the first top wall and the first base wall.

7. The mechanical assembly of claim 1, wherein the first and second sheets are constructed of a material selected from the group consisting of metal, stainless steel, fiber composite materials, thermoplastic materials, galvanized steel, stainless steel, aluminum, copper, polyvinyl chlorides, polystyrenes, acetals, nylons, acrylonitrile-butadiene-styrene (ABS), styrene-acrylonitrile (SAN), polyphenylene oxides, polycarbonates, polyvinylchlorides, polyether sulfones, polyaryl sulfones, polyethylene, polystyrene, terephthalates, polyetherketones, polypropylenes, polysilicones, polyphenylene sulfides, polyionomers, polyepoxides, polyvinylidene halides, and derivatives and/or mixtures thereof.

* * * * *